United States Patent [19]

Gibson

[11] 4,295,153

[45] Oct. 13, 1981

[54] STEREOSCOPIC APPARATUS AND METHOD OF USING SAME

[76] Inventor: Stephen Gibson, 547 N. Beachwood Dr., Los Angeles, Calif. 90004

[21] Appl. No.: 135,471

[22] Filed: Mar. 31, 1980

[51] Int. Cl.³ .................. H04N 9/54; H04N 9/60
[52] U.S. Cl. ...................... 358/3; 350/132; 352/60; 358/88
[58] Field of Search ............. 358/3, 88; 352/57, 60; 350/130, 132

[56] References Cited

U.S. PATENT DOCUMENTS 2,931,855 4/1960 Abramson ........................... 358/3
3,457,364 7/1969 Carrillo .............................. 358/3

FOREIGN PATENT DOCUMENTS 2425784 1/1980 France ............................. 358/3

Primary Examiner—Robert L. Richardson
Attorney, Agent, or Firm—William C. Babcock

[57] ABSTRACT

A light weight, compact, stereoscopic apparatus in the form of a lens assembly that can be removably attached to a conventional still motion picture or television camera as an integral unit in place of the normal lens so that a camera may be conveniently converted to three dimensional photography. The lens assembly when used results in superimposed stereoscopic records in color, which superimposed records are of the same size, and when viewed through suitably selected filters are in full relief and color, but when viewed without filters appear as a conventional two-dimensional view.

9 Claims, 4 Drawing Figures

STEREOSCOPIC APPARATUS AND METHOD OF USING SAME

BACKGROUND OF THE INVENTION

1. Field of the Invention

Stereoscopic Apparatus and Method of Using Same.

2. Description of the Prior Art

A number of optical systems have been developed in the past to produce stereoscopic views of a scene. The most practical methods employ means to produce individual records which were made from two laterally displaced positions, generally 2.5 inches apart. This distance corresponds roughly with the human interocular. The records are viewed by suitable means whereby the right eye sees only the right record and the left eye sees only the left record. The resulting effect is a stereoscopic perspective view of the scene. It is important to understand that each of the two records is different from the other by virtue of position relative to the eyes of a human in order that a true stereoscopic view of the scene be presented to the brain. The majority of inventions produced have dealt with methods to record and present these two distinct records to each eye for viewing. Generally, two methods are used to carry out the stereoscopic technique. One method uses separate picture taking means such as separate cameras. Then separate viewing means are used. The other method is a variation on the first which may utilize a composite technique at any of various points in the process. As an example, a single camera may be equipped to make both records or a single strip of film may be used, or in the case of a television system, a picture tube is used to present the separate views with suitable optical means to channel each record to the appropriate eye.

Several problems are common to all methods. Unique distortions not found in two-dimensional technique may be created at any point in the stereoscopic process so as to present a stereoscopic view of the scene of improper perspective. Most notable are those distortions produced by unequal optical paths to each record, improper camera interaxial IE, lens separation, poor vertical registration, and cross-talk, a condition whereby each eye may also see part of the image intended for the other eye. Varied amounts of these distortions seem to greatly affect the quality of the stereoscopic view.

The most popular method of composite film or television recording means has been the application of a prism or mirror assembly in front of the lens of a single camera. The prisms or mirrors present two distinct and separate views of the scene to the lens. The apparent viewing positions may be spaced about 2.5 inches apart. The image presented to the lens may be a coded composite view such as achieved by the application of filter means, or the image may be two adjacent views spaced laterally or vertically. The particular problems with this technique are that the image may suffer from unequal path lengths which make one record appear as though it was made at a point closer to the scene. This is a very noticeable distortion. Also, only lenses of moderate to long focal length can be used due to the limited aperture of the front reflector optics.

A primary object of the present invention is to provide a lens assembly that may be mounted on a conventional camera used in producing two dimensional views and transform the latter to one in which each of the stereoscopic records is of substantially the same size, and the invention employing lenses of short focal lengths such as used in normal production without vignetting the record.

Still another object of the invention is to provide a method of adjusting horizontal displacement of the aforementioned record pairs relative to each other, thereby providing convergence adjustment means to the camera operator so as to control the degree of relief in the picture, said adjustment means allowing the taking of stereoscopic pictures that may be viewed in three-dimensions with suitable filter means or as simultaneous conventional two-dimensional pictures.

It is yet another object of the present invention to provide a system of three-dimensional color television signals.

Still another object of this invention is to provide adjustment means to control the ratio of luminosity of each record to the other so as to provide a color rendition of wide spectral range and deep saturation not possible with previous composite color three-dimension methods.

SUMMARY OF THE INVENTION

The stereoscopic apparatus of the present invention replaces the lens of a conventional still, motion picture, or television camera. No further modification is necessary. The stereoscopic apparatus may consist of two similar lenses placed in front of an equal path mirror/prism beam splitting assembly which is attached to the camera body. Suitable filter means which pass equal amounts of the light spectrum are interposed in the light beams to code the two images. The filters may be color complementary or polarizing depending on the recording medium. Suitable glasses or screens equipped with filters similar to those used in recording may be used to view the scene in three-dimensions. Additionally, neutral density filters may also be interposed to control luminosity of the individual beams thereby presenting a view in full color and eliminating a condition known to those familiar to the art as "retnal rivalry". Specific adjusting means are provided in various embodiments of the invention to control image displacement and lens toe-in.

DESCRIPTION OF THE PREFERRED EMBODIMENTS

Figure 1:
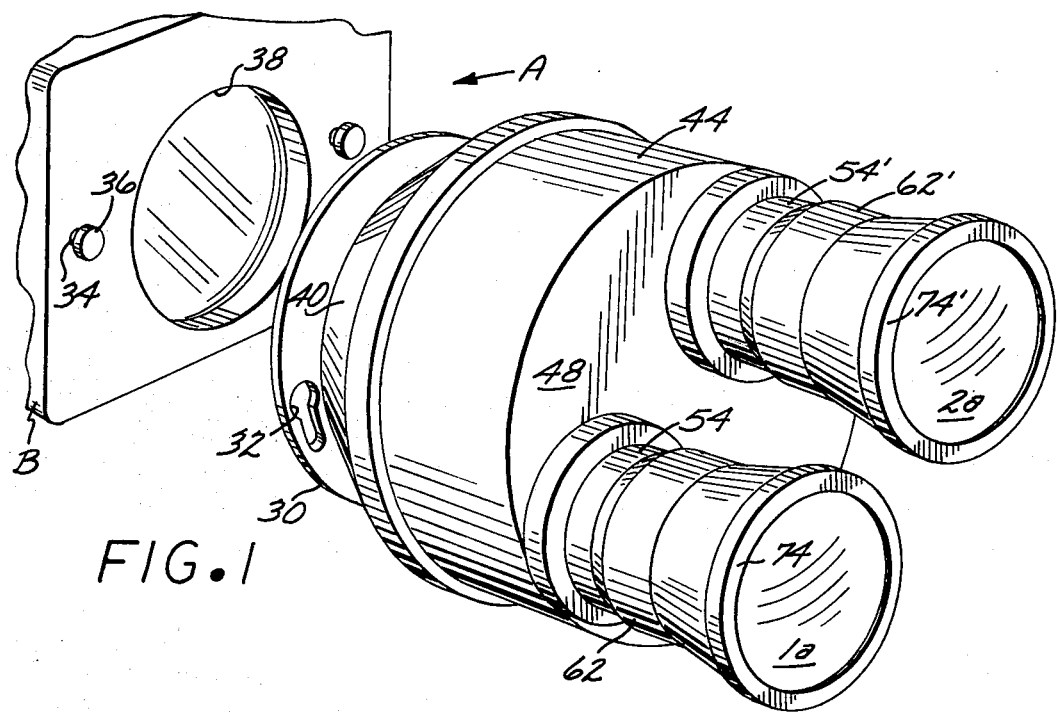
FIG. 1 is a perspective view of the stereoscopic apparatus removably mounted on a conventional camera.

A first form A of the stereoscopic apparatus is shown in FIG. 1 that includes a rearwardly disposed flange 30 that have a plurality of spaced key hole shaped opening 32 therein that may have pins 34 that support heads 36 extended therethrough. The pins 34 extend forwardly from an opaque housing B that may be a part of a conventional still, motion picture, or television camera. The pins 34 and heads 36 serve to removably support a lens assembly (not shown) on the housing B to permit two dimensional pictures to be taken, but when the lens assembly is removed, the pins 34 and heads 36 serve to removably secure the stereoscopic apparatus A to the housing B in communication with an opening 38 in the housing B. When the pins 34 and heads 36 are extended through openings 32 and the apparatus A rotated slightly relative thereto, the apparatus A is removably supported on housing B.

Figure 2:
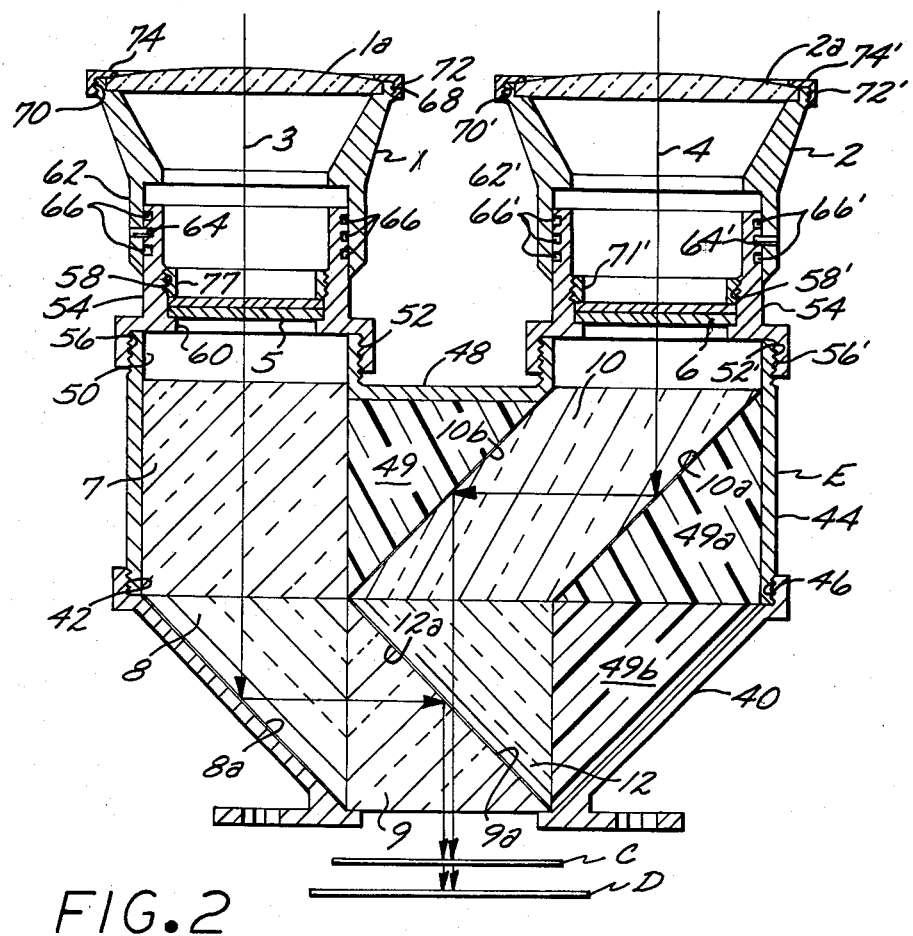
FIG. 2 is a longitudinal cross-sectional view of a first form of the invention.

Apparatus A as may be seen in FIG. 1 includes first and second lens holders 1 and 2 in which first and second lens 1a and 2a are mounted that admit first and second separate bundles of light rays 3 and 4, representing left and right perspective views of the scene. For simplicity of illustration the first and second bundles of light 3 and 4 are depicted in FIG. 2 as single lines.

First light rays 3 after passing through lens 1a proceed through a first filter pack 5. Second light rays 4 after passing through second lens 2a proceeds through a second filter pack 6. The first filter pack 5 may be of a color complementary filter such as the color cyan, and a neutral density filter to control the luminosity of first rays 3 relative to second rays 4 as the latter passes through second filter pack 6. First and second filter packs 5 and 6 may be placed forwardly of the first and second lens 1a and 2a without departing from the method in which the present invention is used.

First light rays 3 continue into a generally cubic glass block 7 and a first prism 8 that is in abutting contact therewith. The hypotenuse 8a is silvered to reflect first light rays 3 ninety degrees to a second prism 12 that is secured to the first prism 8. The first prism 8 has a second prism 9 in abutting contact therewith, and the second prism having a second hypotenuse 9a that is in contact with a third hypotenuse 12a of a third prism 12. The second and third hypotenuses 9a and 12a are semi-silvered to reflect first light rays at ninety degrees onto light sensitive recording means D. The back focal length of first lens 1a by means later to be described is adjusted to form a real image on recording means D.

The distance first rays 3 traverse after entering first lens 1a to the recording means D is substantially the same as that traveled by the second rays 4. The first and second lens 1a and 2a may be of short focal length such as those used in normal production, and without vigenetting the images produced on the recording means D.

Concurrently with the passage of first light rays 3 through the first lens 1a, second light rays 4 pass through the second lens 2a. Second light rays 4 after passing through second lens 2a continues through a second filter pack 6 that is a complement to first filter pack 5.

The filter in second filter pack 6 may be red-orange and if desired may also include a neutral density filter to control luminosity of second rays 4 relative to first rays 3.

The second rays 4 after passing through the second filter pack 6 enter a parallelogram shaped block of glass 10 that has parallel sides 10a and 10b as best seen in FIG. 2. The sides 10a and 10b are semi-silvered to reflect the second light rays 4 ninety degrees into the third prism 12. The semi-silvered surfaces on the hypotenuses 9a and 12a allow second rays 4 that have been reflected thereto from the silvered side 11 to pass to the recording means D. The back focal length of the second lens 2a has been adjusted by means later to be described to form a real image on the recording means 14. The parallelogram shaped block 10 and the third prism 12 should have the same index of refraction as the glass block 7 as well as the second prisms 8 and 9 whereby the separate images produced by the first and second light rays 3 and 4 from the first and second lens 1a and 2a are of equal size. Housing B includes a conventional shutter C. The semi silvered surfaces of the hypotenuses 9a and 12a allow the second light rays 4 to pass therethrough. The above-described optical arrangement reduces annoying image size disparity, aniseikonia, and it also allows the use of lenses of short focal length which were heretofor not possible with conventional lens/prism optical systems. The use of lenses 1a and 2a of short focal lengths result in a greater depth of field for a given light level, as well as greater depth perspective than is possible with fixed interaxial embodiment.

An assembly E serves to hold all the optical elements above described, with the exception of first and second lens 1a and 2a, in a fixed position relative to one another. The assembly E, by use of the flange 30 that forms a part thereof, may after a two-dimensional lens unit (not shown) is removed from camera housing B, may be mounted on the camera housing and transform the latter to one that concurrently records first and second images on the light sensitive means D due to the first and second bundles of light rays 3 and 4 impinging on the latter.

The assembly E that permits the optical elements previously described to be mounted on the housing B in light communication with the opening 38 therein may take various forms and shapes. Assembly E is formed from an opaque material such as a suitable polymerized resin or the like. In FIG. 2 the assembly E is illustrated as including a conical shell 40 that extends outwardly from the ring-shaped flange 30, with the shell having threads 42 on the free end thereof that are engaged by threads 46 defined on a circular shell 44.

The shells 40 and 44 are in conjunction with a transverse web 48 that forms a part of the latter and spacer blocks 49, 49a, 49b shown in FIG. 2 support glass block 7 and parallelogram shaped block 10 in fixed relationship with one another. A first circular boss 50 projects forwardly from web 48 and is axially aligned with block 7 as shown in FIG. 2. The outer end of first boss 50 has threads 52 defined on the outer end thereof that engage threads 56 formed on a first collar 54. The first collar 54 has threads 58 formed on the forward end thereof. A circular rib 60 extends inwardly in first collar 54 and has a peripheral portion of the first filter pack 5 resting thereon.

The lens holder 1 includes a cylindrical shell 62 that has a pin 64 extending inwardly therefrom that slidably engages a helical groove 66 defined on the exterior surface of collar 54. An externally threaded ring 71 engages threads 58 and serves in conjunction with rib 60 to removably support first filter pack 5 in first lens holder 1. A second collar 72 is provided that has threads 70 defined on the interior thereof that engage threads 68 on the forward extremity of lens holder 1. Collar 72 includes an inwardly extending lip 74 that grips the peripheral edge of first lens 1a. When the lens holder 1 is rotated relative to collar 54 the first lens 1a is moved longitudinally relative to the light sensitive recording means D. The second lens holder 2 is supported from a second boss 50' that projects forwardly from web 48 by a second structure that is the same as the first structure above described in conjunction with the first lens holder 1. The components used in supporting the second lens holder from frameword 48 are identified by the same numerals used in describing the supporting elements for the first lens holder 1 but with primes added thereto. The lateral spacing between the centers of lens holders 1 and 2 is preferably substantially two and one-half inches.

From the above description of the first form A of the invention it will be seen that a portable unit is provided that may be readily used to convert a still, motion picture, or television camera that includes a housing B and that is used for taking two dimensional views into a stereoscopic camera used for taking three dimensional views with a minimum of alterations of the structure of the camera. When the invention A is used in the manner above described the resulting records on the light sensitive means D may be alternately viewed through suitably selected filters in full relief and color, or viewed without filters as a conventional two-dimensional view.

Figure 3:
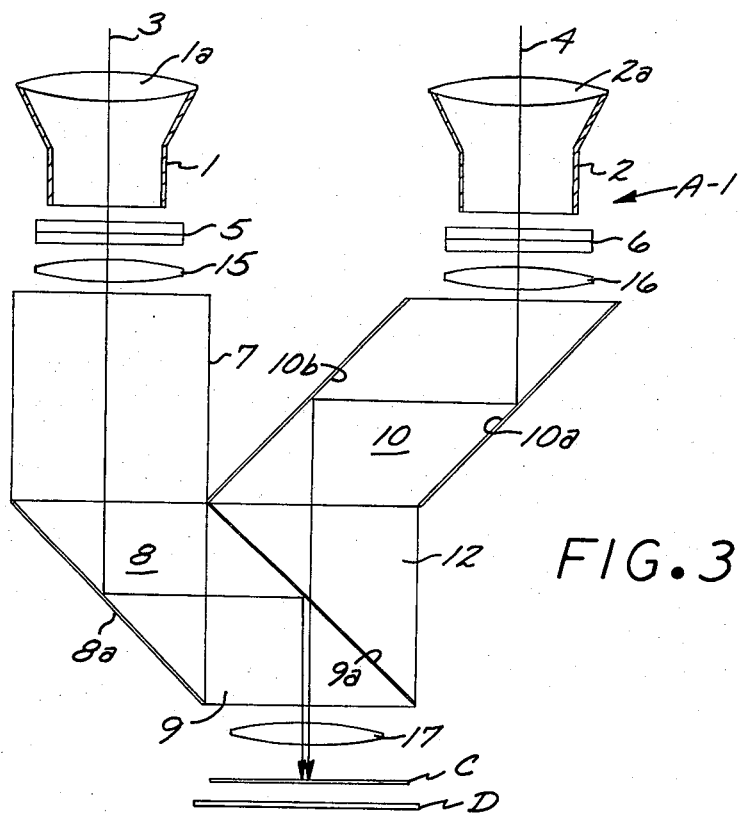
FIG. 3 is a diagrammatic view of a second form of the invention.

Referring now to FIG. 3 where a second form A-1 of the apparatus is illustrated, the light paths are substantially the same as those in FIG. 1, supplementary lenses 14, 16 and 17 are introduced to allow the preferred use of conventional camera lenses of fixed back focal length such as may be found on various still, motion picture, or television cameras. Supplementary lens 15 may be focused at the back image plane of lens 1a, thereby causing beam 3 to become collimated and pass through block 7 and prisms 8 and 9 to supplementary lens 17 as parallel light. Supplementary lens 17 then brings beam 3 to focus on image recording means D.

Substantially the same process takes place with beam 4, which, after passing through lens 2a and filter pack 6 is collimated by supplementary lens 16 and passes through prisms 10, 11, 12 and 9 where beam 4 is focused onto image recording means D by supplementary lens 17. The application of supplementary lenses 14, 16 and 17 inverts the image. In a normal motion picture or television camera, the image is also inverted by lenses that may be similar to lens 1a or 2a. The net effect of the optical system of FIG. 3 might be that no inversion of the image takes place. Further modification of the camera might be necessary to reduce the system of FIG. 3 to practice but for the application of simply changing prism 8 to a roof or amiciprism in the case of beam 3 and also changing prism 10 or 11 to a roof or amici prism for beam 4 to reinvert the image on image recording means 14.

The optical elements in the second form A-1 of the invention are held in desired spaced relationship by the assembly E that is modified in conventional manner to support the supplementary lens 15, 17 and 17.

Figure 4:
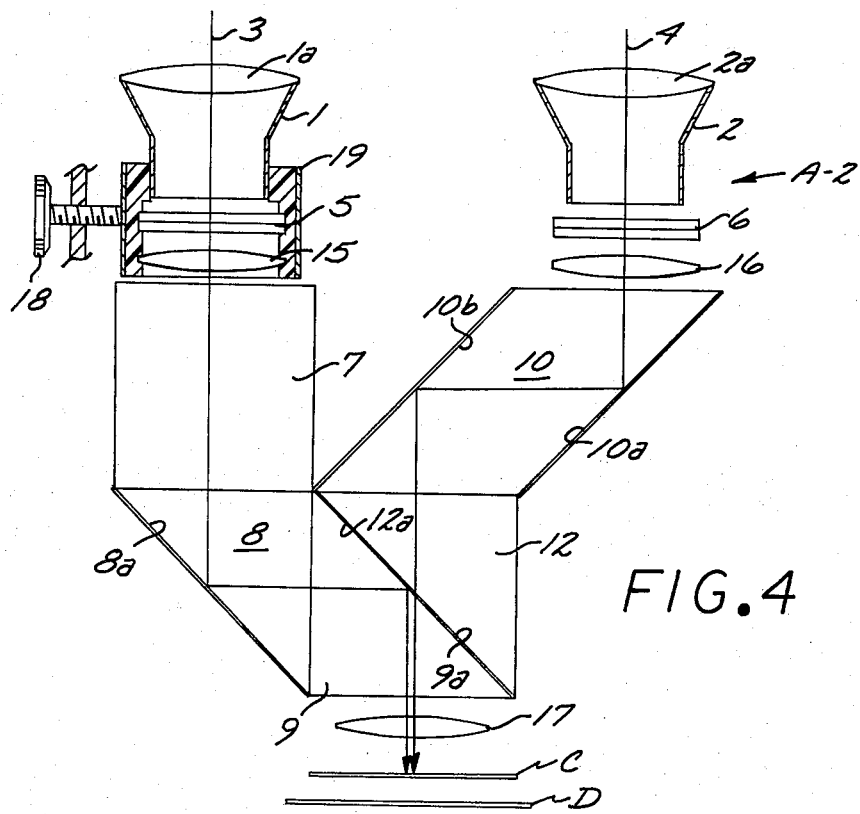
FIG. 4 is a diagrammatic view of a third form of the apparatus.

Referring now to FIG. 4 for a third form A-3 of the invention, a screw 18 and carrier 19 are introduced as a lens interaxial/convergence control assembly to adjust depth content of the stereoscopic view. Lens 1a, filter pack 5, and lens 15 are mounted on a carrier 19 that is adjustably and laterally movable relative to assembly E on which is mounted by conventional means. It is not necessary for filter pack 5 to be mounted on carrier 19, however it may become convenient when the invention is reduced to practice. In practice, screw 18 is rotated and comes to bear on carrier 19 and moves it toward lens 4 causing beam 3 to move closer to beam 4 at image recording plane 14. The net effect will be to reduce the depth in the resulting stereoscopic view. Of course, lens 2a, filter pack 6 and lens 16 may also be moved relative to lens 1a and produce the same results at image recording plane D. Screw 18 may also be affixed to cause carrier 19 to rotate about the axis of beam 3 to "toe-in" the lenses. Lens toe-in produces a small amount of keystone distortion of the resulting image and should be avoided.

In practice, the lens interaxial/convergence adjustment of screw 18 and carrier 19, together with the focal length of lenses 1a and 2a determine lens convergence. If some other convergence point is desired, then either focal length or interaxial may be adjusted. Lens toe-in may also be used.

To achieve records which may be viewed in two-dimensions as well as three-dimensions with the subject invention, it is a simple matter to adjust knob 18 and cause carrier 19 to move lens 1a relative to lens 2a while viewing the resulting images in a camera finder. If significant image disparity or "fringing" is noted, then it is a simple matter to adjust the focal length of lenses 1a and 2a to reduce this disparity. This fringing may not be eliminated completely due to the slight separation of lenses 1a and 2a, nor is it desirous in as much as a condition of no image disparity or zero fringing is only two-dimensional and devoid of any depth cue information. Ideally, filter pack 5 must not pass any light in the bandpass of filter pack 6 or cross-talk between channels will be seen. However, recent researches by Dr. Edwin Land suggest that a richer color rendition may be achieved if equal amounts of complementary colors reach image recording means. The specific application of neutral density filters at filter pack 5 and 6 control color luminosity ratios. Considerable research into Land's work by the inventor suggest that empirically derived amounts of cross-talk between color channels may further improve color rendition and in the preferred embodiment of the invention may occur in the region of the color yellow. Therefore, filters 5 and 6 are not sharp cut-off, but provide a measured amount of cross talk dependent on the media used at image plane D and the viewing means employed.

The use of measured amounts of cross-talk restore luminescence levels in a color television transmission system to produce a compatible two-dimensional picture when viewed in black and white. Reduced interaxial and adjusted lens focal lengths may also achieve a compatible two-dimensional color television picture of reduced depth with the subject invention. If normal stereoscopic perspective is maintained, then an excellent three-dimensional color television picture is produced, however black and white versions of the picture may suffer due mostly to cross-talk of luminescence information. To improve two-dimensional viewing in black and white, the red pick-up camera tube of the color television camera must not be allowed to contribute to the luminescence information channel by matrix adjustment or filter means or, in the case of 4 tube cameras, a cyan filter may be simply interposed in the luminescence derived light beam and the tube gain adjusted.

The use and operation of the inventions have been described previously in detail and need not be repeated.

What is claimed is:

1. In combination with a camera that includes a housing on which a lens assembly is removably supported by first means on the exterior thereof to record a two-dimensional of a scene on light sensitive means on the interior of said housing, an apparatus that may replace said lens assembly and transform said camera to one that is capable of recording superimposed left and right hand perspective views of said scene that are of the same size on said light sensitive means and that impart a stereoscopic effect to a user when viewed through suitable filters and that appear as a conventional two-dimensional record when viewed without a filter, said apparatus including: p1 a. first and second lenses of the same focal length that are laterally spaced and lie in a common transverse plane that transmit first and second light rays that represent left and right hand perspective views of said scene;
- b. first and second filter means to control the luminosity of said first and second rays relative to one another;
- c. first and second light transmitting means through which said first and second light rays pass in first and second paths of substantially equal length;
- d. an opaque housing that supports said first and second lenses, first and second filters, and first and second light transmitting means in such relationship that said first and second light rays as they emerge from said first and second light transmitting means provide real left and right hand perspective images of said scene that are super imposed; and
- e. second means on said housing that removably secure said housing to said first means for said real left and right hand perspective images to be projected from said first and second light transmitting means onto said light sensitive means in said camera.

2. An apparatus as defined in claim 1 in which said first light transmitting means includes first and second light transmitting prisms, a layer of silver on the hypotenuse of the first prism to reflect said light rays and change their direction of travel substantially ninety degrees and a semi silver layer on the hypotenuse of said second prism to reflect said second rays and change the direction of travel thereof substantially ninety degrees onto said light sensitive means.

3. An apparatus as defined in claim 2 in which said second light transmitting means includes a parallelogram block having first and second sides and first and second ends of light transmitting material, first and second light reflecting films on said first and second sides, a third prism in abutting contact with said first end, with the hypotenuse of said third prism in abutting contact with the hypotenuse of said second prism, and said second light ray after entering said second end being reflected between said first and second light reflecting films to emerge from said second end and pass through said third and second prisms to said light sensitive means.

4. An apparatus as defined in claim 3 in which the lengths of the paths of said first and second light rays through said first and second light transmitting means are substantially equal.

5. An apparatus as defined in claim 1 which in addition includes:
- f. first and second manually operated adjustment means for moving said first and second lenses longitudinally relative to said light sensitive means.

6. An apparatus as defined in claim 1 which in addition includes:
- f. first manually operated means for moving said first lens laterally relative to said second lens.

7. An apparatus as defined in claim 1 which in addition includes:
- f. first manually operated adjustment means for moving said first and second lenses longitudinally relative to said light sensitive means;
- g. second manually operated means for moving either said first lenses and first filter means or said second lenses and second filter means laterally relative to the other thereof.

8. A method of using said apparatus as defined in claim 7 in which said camera is a television camera that includes a red pick-up tube to provide a compatible two dimensional image when viewed in black and white on said light sensitive means, which method includes the steps of:
- a. manipulating said first and second manually operated adjustment means to reduce interaxial and focal lengths of said first and second lenses; and
- b. utilizing filter means to prevent said red pick up tube contributing to the luminescense information channel.

9. A method as defined in claim 8 in which said camera is a four tube camera, and said filter means is a cyan filter interposed in the luminescense derived light beam, and said method including the additional step of adjusting the tube gain of said camera.

* * * * *